US012563387B2

(12) United States Patent
Manoharan et al.

(10) Patent No.: US 12,563,387 B2
(45) Date of Patent: Feb. 24, 2026

(54) SELECTION OF A PAIRWISE MASTER KEY (PMK) CACHING METHOD IN A WIRELESS DEPLOYMENT

(71) Applicant: Cisco Technology, Inc., San Jose, CA (US)

(72) Inventors: Jegan Manoharan, Bangalore (IN); Niranjan Mallapura Mallikarjunaiah, Bangalore (IN); Gokul Bhoothanathan Kailasanatha Subramania, Bengaluru (IN)

(73) Assignee: Cisco Technology, Inc.

( * ) Notice: Subject to any disclaimer, the term of this patent is extended or adjusted under 35 U.S.C. 154(b) by 353 days.

(21) Appl. No.: 18/304,712

(22) Filed: Apr. 21, 2023

(65) Prior Publication Data

US 2024/0357345 A1      Oct. 24, 2024

(51) Int. Cl.
*H04W 12/04* (2021.01)
*H04L 9/08* (2006.01)

(52) U.S. Cl.
CPC ........... *H04W 12/04* (2013.01); *H04L 9/0894* (2013.01)

(58) Field of Classification Search
CPC ...... H04W 12/04; H04W 12/06; H04L 9/0894
USPC ........................................................ 455/410
See application file for complete search history.

(56) References Cited

U.S. PATENT DOCUMENTS

| | | | | |
|---|---|---|---|---|
| 8,959,607 B2 * | 2/2015 | Yadav | ...................... | H04L 9/14 |
| | | | | 713/168 |
| 10,623,951 B2 * | 4/2020 | Palanigounder | .... | H04W 12/041 |
| 2006/0256763 A1 * | 11/2006 | Nguyen | .............. | H04W 12/041 |
| | | | | 370/338 |
| 2015/0281194 A1 * | 10/2015 | Elliott | ................... | H04W 12/06 |
| | | | | 726/7 |
| 2018/0041930 A1 * | 2/2018 | Hampel | ............ | H04W 74/0833 |
| 2021/0306850 A1 * | 9/2021 | Gandhi | ................ | H04B 17/318 |

FOREIGN PATENT DOCUMENTS

| | | | | |
|---|---|---|---|---|
| CN | 118338371 A | * | 7/2024 | ........ H04W 12/0431 |
| WO | 2018170061 A1 | | 9/2018 | |

OTHER PUBLICATIONS

Huawei, "Wireless Access controller (AC and FIT AP) V200R019C00 CLI-Based Configuration Guide", Nov. 15, 2021 (96 Pages).

* cited by examiner

*Primary Examiner* — Qutbuddin Ghulamali
(74) *Attorney, Agent, or Firm* — Merchant & Gould P.C.

(57) ABSTRACT

A selection of a Pairwise Master Key (PMK) caching method in a wireless deployment may be provided. One or more PMK caching methods that are supported by a wireless infrastructure may be advertised. A selection of a PMK caching method based on the advertised one or more PMK caching methods may be received from a first station. The first station may be authenticated in the wireless infrastructure. In response to authenticating, a PMK entry in a cache store associated with the PMK caching method may be created for the first station based on the selection.

18 Claims, 5 Drawing Sheets

100

PMK Cache Store

100

PMK Cache Store

112

WLC    110

106

108

102

104

STA1

STA2

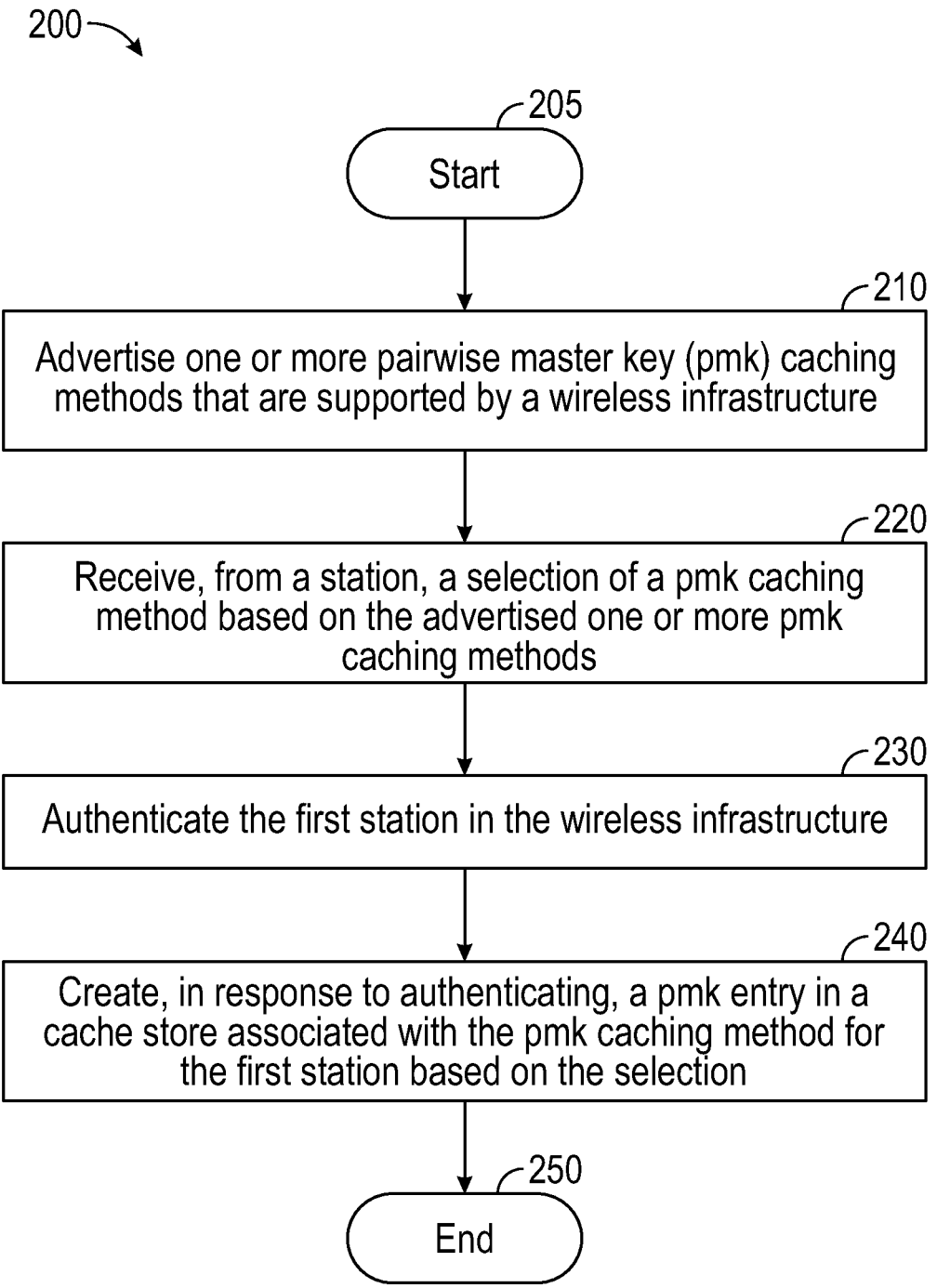

200

205
Start

210
Advertise one or more pairwise master key (pmk) caching methods that are supported by a wireless infrastructure 220
Receive, from a station, a selection of a pmk caching method based on the advertised one or more pmk caching methods 230
Authenticate the first station in the wireless infrastructure 240
Create, in response to authenticating, a pmk entry in a cache store associated with the pmk caching method for the first station based on the selection 250
End

| Bit | Information | Notes |
|---|---|---|
| 0-3 | Field length | The length of the extended RSN Capabilities field, in octets, minus 1. i.e., $n$ - 1 |
| 4 | Protected TWT Operations Support | The STA sets the Protected TWT Operations Support field to I when dot11ProtectedTWTOperationsImplemented is true, and sets it to 0 otherwise. See 10.47.1 |
| 5 | SAE hash-to-element | The STA supports directly hashing to obtain the PWE instead of looping. See 12.4.4.2.3 and 12.4.4.3.3. |
| 6 - (8x$n$ - 1) | Reserved | |

| Size | Value(hex) | Description |
|---|---|---|
| Uint8 | DD | Vendor specific element ID |
| Uint8 | 05 ~ 08 | Length (variable value subject to change) |
| Uint8*3 | 00 40 96 | Vendor specific OUI |
| Uint8 | x | Uniquely identifies the DEO (Device Ecosystem Options) IE |
| Uint8 | variable | Capabilities bit field: b0 and b1 ca be used to set caching capability |

| Element ID | Length | Extended Capabilities |
|---|---|---|
| 1 | 1 | Varible |

Octets:

340

| Element ID | Length | MDID | FT Capability and Policy |
|---|---|---|---|
| 1 | 1 | 2 | 1 |

Octets:

350

| B0 | B1 | B2 | B7 |
|---|---|---|---|
| Fast BSS Transition Over DS | Resource Request Protocol Capability | Reserved | |
| 1 | 1 | 6 | |

Bits:

SELECTION OF A PAIRWISE MASTER KEY (PMK) CACHING METHOD IN A WIRELESS DEPLOYMENT

TECHNICAL FIELD

The present disclosure relates generally to a selection of a Pairwise Master Key (PMK) caching method in a wireless deployment.

BACKGROUND

In computer networking, a wireless access point (AP) is a networking hardware device that allows a Wi-Fi compliant client device to connect to a wired network. The AP usually connects to a router (directly or indirectly via a wired network) as a standalone device, but it can also be an integral component of the router itself. Several APs may also work in coordination, either through direct wired or wireless connections, or through a central system, commonly called a wireless Local Area Network (WLAN) controller. An AP is differentiated from a hotspot, which is the physical location where Wi-Fi access to a WLAN is available.

Prior to wireless networks, setting up a computer network in a business, home or school often required running many cables through walls and ceilings in order to deliver network access to all of the network-enabled devices in the building. With the creation of the wireless access point, network users are able to add devices that access the network with few or no cables. An AP normally connects directly to a wired Ethernet connection and the AP then provides wireless connections using radio frequency links for other devices to utilize that wired connection. Most APs support the connection of multiple wireless devices to one wired connection. Modern APs are built to support a standard for sending and receiving data using these radio frequencies.

BRIEF DESCRIPTION OF THE FIGURES

The accompanying drawings, which are incorporated in and constitute a part of this disclosure, illustrate various embodiments of the present disclosure. In the drawings:

FIG. 2 is a flow chart of a method for a selection of a Pairwise Master Key (PMK) caching method in a wireless deployment;

FIG. 3A illustrates a Robust Security Network (RSN) extension Information Element (IE);

FIG. 3B illustrates a vendor specific IE;

DETAILED DESCRIPTION

Overview

Figure 1:
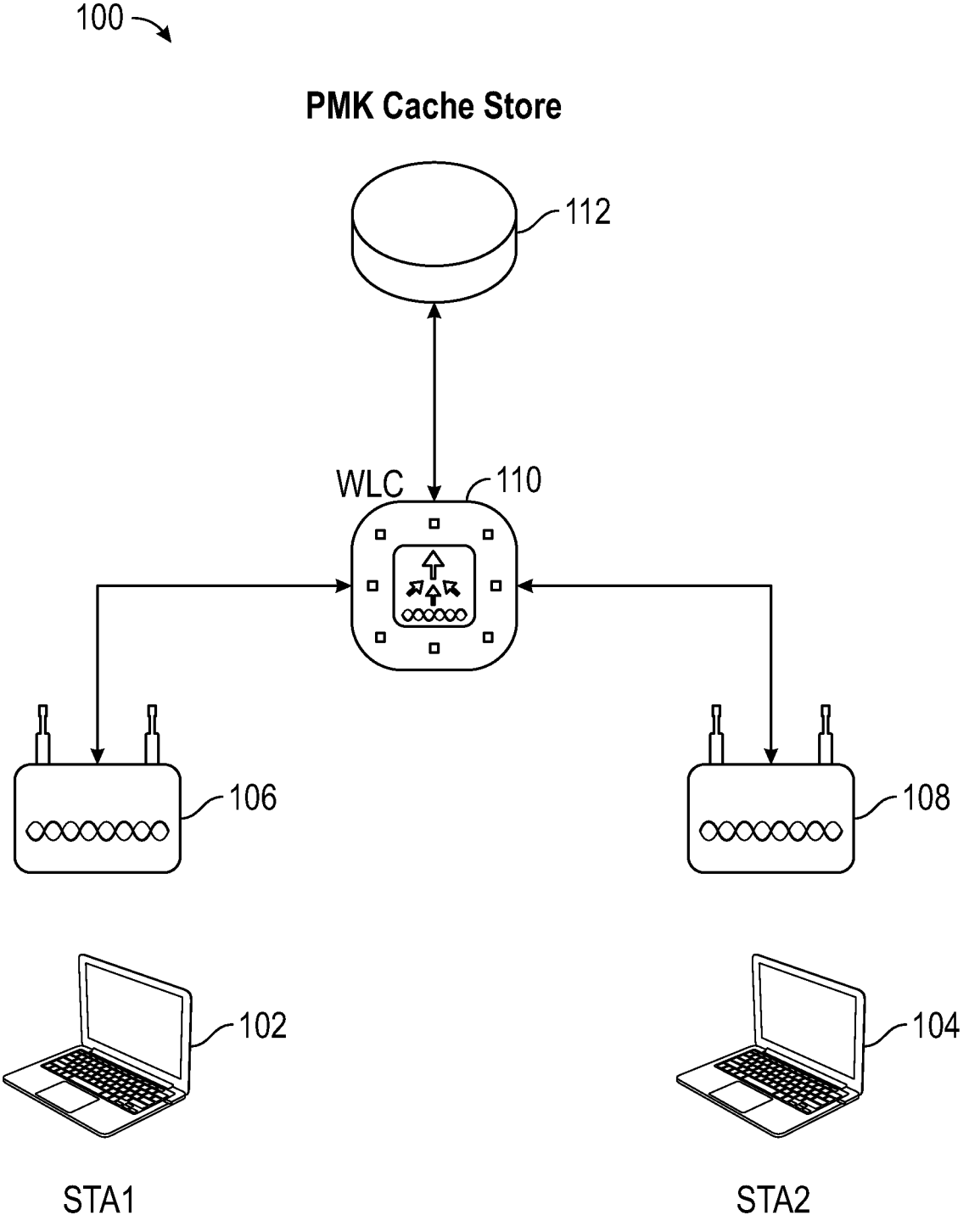
FIG. 1 is a block diagram of an operating environment.

Selection of a Pairwise Master Key (PMK) caching method in a wireless deployment may be provided. One or more PMK caching methods that are supported by a wireless infrastructure may be advertised. A selection of a PMK caching method based on the advertised one or more PMK caching methods may be received from a first station. The first station may be authenticated in the wireless infrastructure. In response to authenticating, a PMK entry in a cache store associated with the PMK caching method may be created for the first station based on the selection.

Both the foregoing overview and the following example embodiments are examples and explanatory only, and should not be considered to restrict the disclosure's scope, as described and claimed. Furthermore, features and/or variations may be provided in addition to those described. For example, embodiments of the disclosure may be directed to various feature combinations and sub-combinations described in the example embodiments.

EXAMPLE EMBODIMENTS

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Pairwise Master Key (PMK) caching in a wireless deployment may skip authentication of a station and allow faster transition between different Access Points (APs) or during re-association to an AP. Sticky Key Caching (SKC) and Opportunistic Key Caching (OKC) may be two methods of PMK caching. SKC may create a PMK for a station per Access Point (AP) and OKC may create a central PMK for the station. However, there may not be a known method to determine whether a wireless infrastructure or a station may use a specific PMK caching method and an expiry time of a PMK. The lack of identifying process for the PMK caching in either entity (i.e., the wireless infrastructure or the station) may lead to uncertainty in deployment and may obviate a purpose of the PMK caching at times. In addition, presuming presence of a PMK in other entity may increase a transition or re-association time.

OKC may allow a station and a wireless deployment (e.g., a Wireless Local Area Network (WLAN) deployment) to cache only one PMK (i.e., a common PMK) associated with a Service Set Identifier (SSID) of the station. OKC may store the common PMK for the station at a central server. SKC may create a PMK for a station per AP. That is, every roam to a new AP in SKC may need a full authentication. In SKC, the PMK may be stored within an AP. Hence, a central server to store the PMK may not be needed.

Both caching methods may have their own pros and cons. OKC, for example, may be better in large wireless deployments (e.g., an enterprise, a warehouses, etc.) SKC, on the other hand, may be better in smaller wireless deployments (e.g., a coffee shop, a restaurant, etc.) SKC in large wireless deployments may consume lot of memory to store the PMK for every station at every AP.

Different wireless station vendors may implement PMK caching differently. Some vendors may support only SKC while some other vendors may support both SKC and OKC. Similarly, wireless infrastructure device vendors may implement either one or both SKC and OKC. If a station supports SKC and an AP or a Wireless LAN Controller (WLC) supports only OKC, then this deployment may not utilize PMK caching and may need a full authentication. Similarly, if a station supports OKC and an AP or a WLC supports SKC, then PMK caching may not be used. If a station and an AP/WLC supports both SKC and OKC, there may not be a method to choose between OKC and SKC to be used either by the station or the AP/WLC. Some wireless infrastructure may support a maximum of 8 PMKs per station in case of SKC. If a station is roaming frequently (e.g., a fast-moving vehicle like train) and that station uses SKC, then it can do fast roam only to a maximum of 8 APs. If the station tries to roam to more than 8 APs, then such roaming may triggers a full authentication.

Some stations may choose OKC as their default caching technique, even if it may support both OKC and SKC. This selection of a default caching method without learning about PMK caching methods supported in a wireless infrastructure may lead to indeterministic behavior. For example, a wireless infrastructure may only support OKC. If such wireless infrastructure attempts to change the PMK, it may delete the old PMK cache and de-authenticate the station. But, the station may not delete the PMK from its cache. If the station attempts to re-associate with the wireless infrastructure through a different AP, the station may attempt re-association with an old PMK. However, since, the wireless infrastructure may have deleted the PMK cache, it may force the station for a full authentication. After the full authentication, the station may create another PMK record in its cache for this new AP while holding the old PMK associated with the old AP. As the station have more than one PMK entry for the SSID, the station may start to use SKC (i.e., PMK entry per AP). In this scenario, the station may change from OKC to SKC which may not be desirable. This disclosure may provide processes to exchange PMK cache information between elements of a wireless infrastructure to identify a PMK caching method.

FIG. 1 shows an operating environment 100 consistent with embodiments of the disclosure for selection of a PMK caching method in a wireless deployment. As shown in FIG. 1, operating environment 100 may comprise a first station 102, a second station 104, first AP 106, a second AP 108, a WLC 110, and a PMK cache store 112. Each first AP 106 and second AP 108 may be compatible with specification standards such as, but not limited to, the Institute of Electrical and Electronics Engineers (IEEE) 802.11 specification standard for example. First AP 106 and second AP 108 may communicate with each other to conduct operations in concert.

WLC 110 may provision and control operating environment 100. WLC 110 may be implemented by a Digital Network Architecture Center (DNAC) controller (i.e., a Software-Defined Network (SDN) controller). First AP 106, second AP 108, and WLC 110 may provide a WLAN. Through this WLAN, first station 102 and second station 104 may be provided with access to a wireless network that may be operated by an institution or an enterprise. Access to the WLAN may provide first station 102 and second station 104 with access to the Internet or other cloud-based networking environments.

First station 102 and second station 104 may comprise, but is not limited to, an AR/VR device, an AP, a phone, a smartphone, a digital camera, a tablet device, a laptop computer, a personal computer, a mobile device, a sensor, an Internet-of-Things (IoTs) device, a cellular base station, a telephone, a remote control device, a set-top box, a digital video recorder, a cable modem, a network computer, a mainframe, a router, or any other similar microcomputer-based device capable of accessing and using a Wi-Fi network.

The elements of operating environment 100 (e.g., first station 102, second station 104, first AP 106, second AP 108, WLC 110, and PMK cache store 112) may be practiced in hardware and/or in software (including firmware, resident software, micro-code, etc.) or in any other circuits or systems. The elements of operating environment 100 may be practiced in electrical circuits comprising discrete electronic elements, packaged or integrated electronic chips containing logic gates, a circuit utilizing a microprocessor, or on a single chip containing electronic elements or microprocessors. Furthermore, the elements of operating environment 100 may also be practiced using other technologies capable of performing logical operations such as, for example, AND, OR, and NOT, including but not limited to, mechanical, optical, fluidic, and quantum technologies. As described in greater detail below with respect to FIG. 4, the elements of an operating environment may be practiced in a computing device 400.

FIG. 2 is a flow chart setting forth the general stages involved in a method 200 consistent with an embodiment of the disclosure for selection of a PMK caching method in a wireless deployment. Method 200 may be performed by first AP 106, second AP 108, or WLC 110. Ways to implement the stages of method 200 may be described in greater detail below.

Method 200 may begin at starting block 205 and proceed to stage 210 where WLC 110 may advertise one or more PMK caching methods that are supported by a wireless infrastructure. The one or more PMK caching methods that are supported by the wireless infrastructure may be broadcasted in a beacon or probe response messages. The one or more PMK caching methods that are supported by the wireless infrastructure may be encoded as a bitmap. The bitmap, in some examples, may be two bits long. For example, 00 may represent no capability, 01 may represent OKC supported; 10 may represent SKC supported; and 11 may represent both OKC and SKC supported.

WLC 110 may include the one or more PMK caching methods in a beacon or a probe response by one of the following: a Robust Security Network (RSN) extension Information Element (IE), a vendor specific IE, extended capabilities element, and mobility domain element. The RSN extension IE may include unused bytes. FIG. 3A illustrates a RSN extension IE 310. As shown in FIG. 3A, in RSN extension IE 310, the 6th bit and onwards bits are reserved. Hence, the 6th bit and the 7th bit or any two consecutive bits from $6^{th}$ bit onwards of RSN extension IE 310 may be used to broadcast a bitmap of the one or more PMK caching methods.

Figures 3C, 3D, 3E:
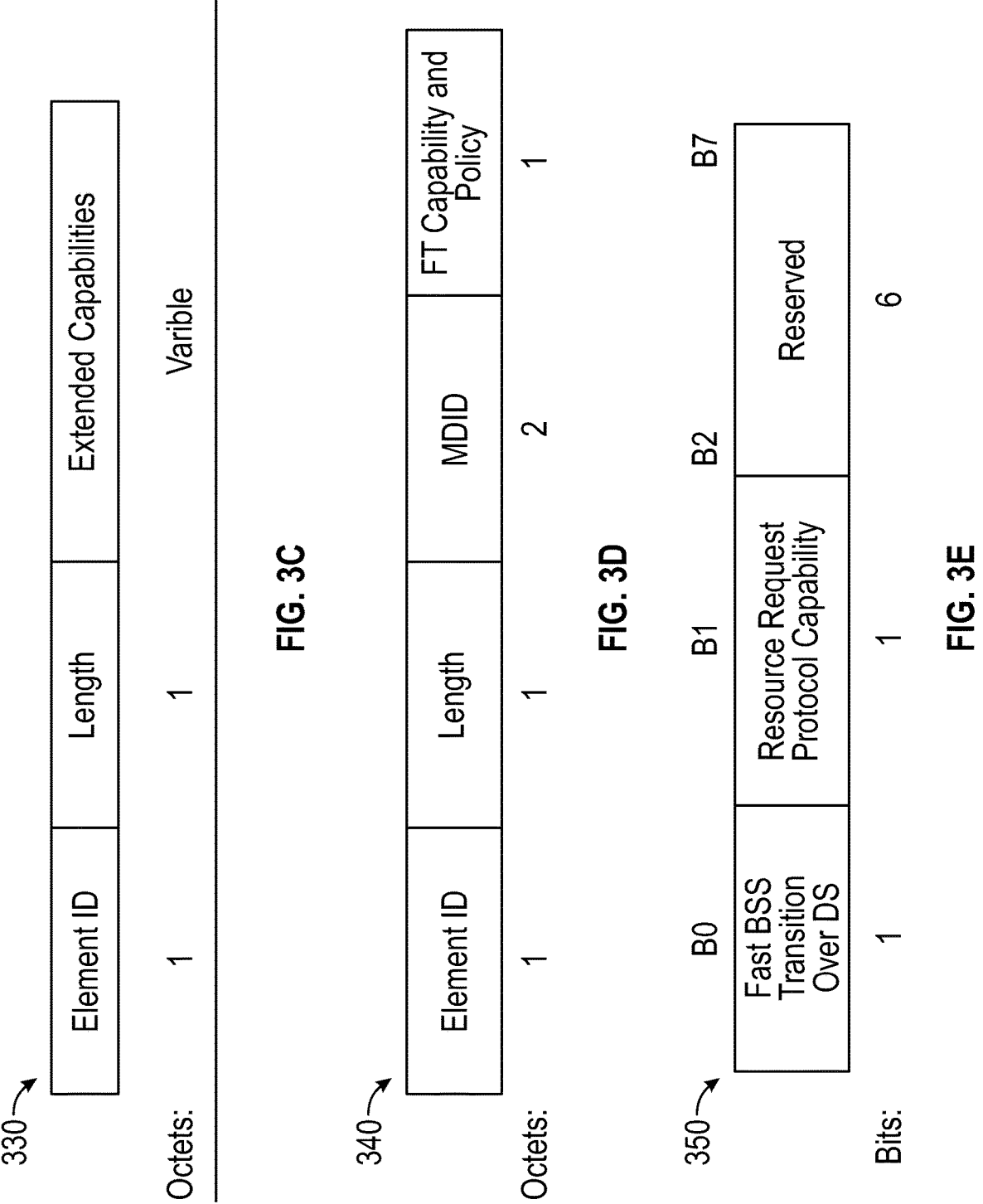
FIG. 3C illustrates an extended capabilities element.
FIG. 3D illustrates a mobility domain element.
FIG. 3E illustrates capability and policy field of the mobility domain element.

Vendor specific IE may be used when wireless infrastructure vendors may want to support this feature for a specific type of station. FIG. 3B illustrates a vendor specific IE 320. As shown in FIG. 3B, b0 and b1 of vendor specific IE 320 may be used to convey a bitmap of the one or more PMK caching methods. FIG. 3C illustrates an extended capabilities element 330. A bitmap of the one or more PMK caching methods may be set in 88th and 89th bit of extended capabilities element 330. FIG. 3D illustrates a mobility domain element 340. A bitmap of the one or more PMK caching methods may be included in capability and policy field of mobility domain element 340. FIG. 3E illustrates capability and policy field 350 of mobility domain element 340. Reserved bit B2 and B3 in capability and policy field 350 may be utilized to include the bitmap of the one or more PMK caching methods. Other types of IEs may be utilized to convey the bitmap of the one or more PMK caching methods.

From stage 210 where WLC 110 advertises the one or more PMK caching methods that are supported by the wireless infrastructure, method 200 may advance to stage 220 where WLC 110 may receive a selection of a PMK caching method from first station 102 based on the advertised one or more PMK methods. First station 102 may select one of OKC or SKC as a PMK caching method for its association with the wireless infrastructure.

In accordance with embodiments of the disclosure, first station 102 may not select a PMK caching method not supported by it. For example, if the advertised one or more PMK methods includes SKC, and first station 102 does not support SKC, then first station 102 may not select a PMK caching method. Similarly, if the advertised one or more PMK methods includes OKC, and first station 102 does not support OKC, then then first station 102 may not select a PMK caching method. First station 102 may select a PMK caching method not present in the advertised one or more PMK methods. For example, the advertised one or more PMK methods may include OKC and first station 102 may select SKC. In another example, the advertised one or more PMK methods may include SKC, and first station 102 may select OKC. First station 102 may inform first AP 106 or second AP 108 of the selection in an association request message which then may be forwarded to WLC 110.

Once WLC 110 receives the selection of the PMK caching method from first station 102 based on the advertised one or more PMK methods in stage 220, method 200 may continue to stage 230 where WLC 110 may authenticate first station 102 in the wireless infrastructure. WLC 110 may perform a full authentication of first station 102.

After WLC 110 authenticates first station 102 in the wireless infrastructure in stage 230, method 200 may proceed to stage 240 where WLC 110, in response to the authentication, may create a PMK entry first station 102 in a cache store associated with the PMK caching method for based on the selection. If the wireless infrastructure supports OKC and first station 102 selects OKC as the PMK caching method, WLC 110 may create a PMK entry in PMK cache store 112 and associate the PMK entry with the SSID of first station 102. If the wireless infrastructure supports OKC and first station 102 selects SKC as a PMK caching method, WLC 110 may create a PMK entry in a PMK cache store at each of first AP 106 and second AP 108 and associate the PMK entry with the SSID of first station 102. Once WLC 110 creates a PMK entry in the cache store associated with the PMK caching method for first station 102 in stage 240, method 200 may then end at stage 250.

If first station 102 selects a PMK caching method that is not supported by the wireless infrastructure or is different from a PMK caching method supported by the wireless infrastructure, then a PMK entry may not be created. For example, if first station 102 selects OKC while the wireless infrastructure supports only SKC, then a PMK entry may not be created. Similarly, if first station 102 selects SKC while the wireless infrastructure supports only OKC, then a PMK entry may not be created. Moreover, if first station 102 does not select a PMK caching method, then a PMK entry may not be created. If a PMK entry is not created, then a full authentication is performed for first station 102 when it re-associates with the wireless infrastructure or roams away from one AP to another.

Figure 4:
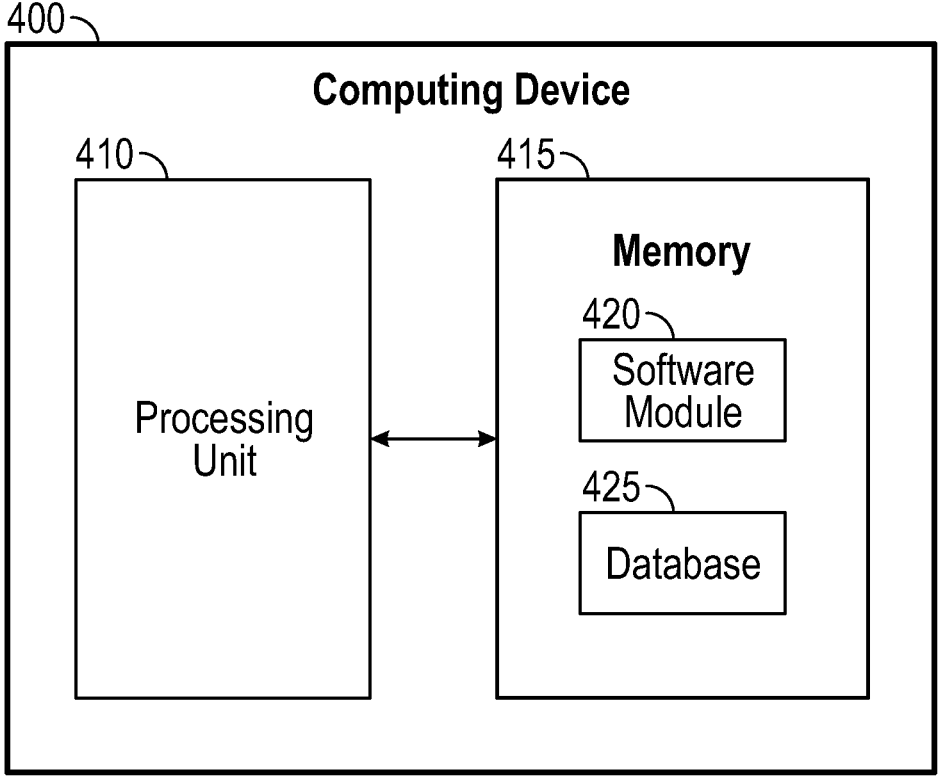
FIG. 4 is a block diagram of a computing device.

FIG. 4 shows computing device 400. As shown in FIG. 4, computing device 400 may include a processing unit 410 and a memory unit 415. Memory unit 415 may include a software module 420 and a database 425. While executing on processing unit 410, software module 420 may perform, for example, processes for selection of a PMK caching method in a wireless deployment, including for example, any one or more of the stages from method 200 described above with respect to FIG. 2. Computing device 400, for example, may provide an operating environment for first station 102, second station 104, first AP 106, second AP 108, WLC 110, and PMK cache store 112. First station 102, second station 104, first AP 106, second AP 108, WLC 110, and PMK cache store 112 may operate in other environments and are not limited to computing device 400.

Computing device 400 may be implemented using a Wireless Fidelity (Wi-Fi) access point, a cellular base station, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay device, or other similar microcomputer-based device. Computing device 400 may comprise any computer operating environment, such as hand-held devices, multi-processor systems, microprocessor-based or programmable sender electronic devices, minicomputers, mainframe computers, and the like. Computing device 400 may also be practiced in distributed computing environments where tasks are performed by remote processing devices. The aforementioned systems and devices are examples and computing device 400 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the element illustrated in FIG. 1 may be integrated onto a single integrated circuit. Such a SOC device may include one or more processing units, graphics units, communications units, system virtualization units and various application functionality all of which may be integrated (or "burned") onto the chip substrate as a single integrated circuit. When operating via a SOC, the functionality described herein with respect to embodiments of the disclosure, may be performed via application-specific logic integrated with other components of computing device 400 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
advertising one or more Pairwise Master Key (PMK) caching methods that are supported by a wireless infrastructure;
receiving, from a first station, a selection of a PMK caching method based on the advertised one or more PMK caching methods;
authenticating the first station in the wireless infrastructure;

creating, in response to the authenticating, a PMK entry in a cache store associated with the PMK caching method for the first station based on the selection;
not receiving, from a second station, a selection of the PMK caching method from the advertised one or more PMK caching methods;
authenticating the second station in the wireless infrastructure; and
not creating, in response to the authenticating the second station in the wireless infrastructure, a PMK entry for the second station.

2. The method of claim 1, wherein the one or more PMK caching methods comprises an Opportunistic Key Caching (OKC) and a Sticky Key Caching (SKC), wherein receiving the selection of the PMK caching method comprises receiving the selection of the OKC, and wherein creating the PMK entry in the cache store associated with the PMK caching method comprises creating the PMK entry in a PMK cache store at a Wireless Local Area Network (LAN) Controller (WLC) of the wireless infrastructure.

3. The method of claim 1, wherein the one or more PMK caching methods comprises an Opportunistic Key Caching (OKC) and a Sticky Key Caching (SKC), wherein receiving the selection of the PMK caching method comprises receiving the selection of the SKC, and wherein creating the PMK entry in the cache store associated with the PMK caching method comprises creating the PMK entry in a SKC cache store at an Access Point (AP) of the wireless infrastructure.

4. The method of claim 1, wherein advertising the one or more PMK caching methods comprises advertising the one or more PMK caching methods in one of the following: a beacon and a probe response message.

5. The method of claim 1, further comprising:
encoding, prior to advertising, the one or more PMK caching methods as a bitmap; and
including the bitmap in an Information Element (IE) of one of the following: a beacon and a probe response message.

6. The method of claim 1, wherein advertising the one or more PMK caching methods comprises advertising the one or more PMK caching methods in one of the following: a Robust Security Network (RSN) extension Information Element (IE), a vendor specific IE, extended capabilities element, and mobility domain element.

7. A system comprising:
a memory storage; and
a processing unit coupled to the memory storage, wherein the processing unit is operative to:
advertise one or more Pairwise Master Key (PMK) caching methods that are supported by a wireless infrastructure;
receive, from a first station, a selection of a PMK caching method based on the advertised one or more PMK caching methods;
authenticate the first station in the wireless infrastructure;
create, in response to the authenticating, a PMK entry in a cache store associated with the PMK caching method for the first station based on the selection;
not receive, from a second station, a selection of the PMK caching method from the advertised one or more PMK caching methods;
authenticate the second station in the wireless infrastructure; and
not create, in response to the authenticating the second station in the wireless infrastructure, a PMK entry for the second station.

8. The system of claim 7, wherein the one or more PMK caching methods comprises an Opportunistic Key Caching (OKC) and a Sticky Key Caching (SKC), wherein the processing unit being operative to receive the selection of the PMK caching method comprises the processing unit being operative to receive the selection of the OKC, and wherein the processing unit being operative to create the PMK entry in the cache store associated with the PMK caching method comprises the processing unit being operative to create the PMK entry in a PMK cache store at a Wireless Local Area Network (LAN) Controller (WLC) of the wireless infrastructure.

9. The system of claim 8, wherein the one or more PMK caching methods comprises an Opportunistic Key Caching (OKC) and a Sticky Key Caching (SKC), wherein the processing unit being operative to receive the selection of the PMK caching method comprises the processing unit being operative to receive the selection of the SKC, and wherein the processing unit being operative to create the PMK entry in the cache store associated with the PMK caching method comprises the processing unit being operative to create the PMK entry in a SKC cache store at a Access Point (AP) of the wireless infrastructure.

10. The system of claim 7, wherein the processing unit being operative to advertise the one or more PMK caching methods comprises the processing unit being operative to advertise the one or more PMK caching methods in one of the following: a beacon and a probe response message.

11. The system of claim 7, wherein the processing unit is further operative to:

encode, prior to advertising, the one or more PMK caching methods as a bitmap; and include the bitmap in an Information Element (IE) of one of the following: a beacon and a probe response message.

12. The system of claim 7, wherein the processing unit being operative to advertise the one or more PMK caching methods comprises the processing unit being operative to advertise the one or more PMK caching methods in one of the following: a Robust Security Network (RSN) extension Information Element (IE), a vendor specific IE, extended capabilities element, and mobility domain element.

13. A non-transitory computer-readable medium that stores a set of instructions which when executed perform a method comprising:

advertising one or more Pairwise Master Key (PMK) caching methods that are supported by a wireless infrastructure;

receiving, from a first station, a selection of a PMK caching method based on the advertised one or more PMK caching methods;

authenticating the first station in the wireless infrastructure; and creating, in response to the authenticating, a PMK entry in a cache store associated with the PMK caching method for the first station based on the selection;

not receiving, from a second station, a selection of the PMK caching method from the advertised one or more PMK caching methods;

authenticating the second station in the wireless infrastructure; and not creating, in response to the authenticating the second station in the wireless infrastructure, a PMK entry for the second station.

14. The non-transitory computer-readable medium of claim 13, wherein the one or more PMK caching methods comprises an Opportunistic Key Caching (OKC) and a Sticky Key Caching (SKC), wherein receiving the selection of the PMK caching method comprises receiving the selection of the OKC, and wherein creating the PMK entry in the cache store associated with the PMK caching method comprises creating the PMK entry in a PMK cache store at a Wireless Local Area Network (LAN) Controller (WLC) of the wireless infrastructure.

15. The non-transitory computer-readable medium of claim 13, wherein the one or more PMK caching methods comprises an Opportunistic Key Caching (OKC) and a Sticky Key Caching (SKC), wherein receiving the selection of the PMK caching method comprises receiving the selection of the SKC, and wherein creating the PMK entry in the cache store associated with the PMK caching method comprises creating the PMK entry in a SKC cache store at a Access Point (AP) of the wireless infrastructure.

16. The non-transitory computer-readable medium of claim 13, wherein advertising the one or more PMK caching methods comprises advertising the one or more PMK caching methods in one of the following: a beacon and a probe response message.

17. The non-transitory computer-readable medium of claim 13, wherein further comprising:

encoding, prior to advertising, the one or more PMK caching methods as a bitmap; and including the bitmap in an Information Element (IE) of one of the following: a beacon and a probe response message.

18. The non-transitory computer-readable medium of claim 13, wherein advertising the one or more PMK caching methods comprises advertising the one or more PMK caching methods in one of the following: a Robust Security Network (RSN) extension Information Element (IE), a vendor specific IE, extended capabilities element, and mobility domain element.

* * * * *